April 28, 1970  R. D. WEAVER  3,508,969
GALVANIC CELL WITH REMOVABLE BARRIER BETWEEN ELECTROLYTE
AND ELECTRODE AND PROCESS FOR ACTIVATING CELL
Filed May 18, 1966

INVENTOR.
Robert D. Weaver
BY
R. J. Wallace
ATTORNEY

United States Patent Office 3,508,969
Patented Apr. 28, 1970

3,508,969
GALVANIC CELL WITH REMOVABLE BARRIER BETWEEN ELECTROLYTE AND ELECTRODE AND PROCESS FOR ACTIVATING CELL
Robert D. Weaver, Santa Barbara, Calif., assignor to General Motors Corporation, Detroit, Mich., a corporation of Delaware
Filed May 18, 1966, Ser. No. 551,094
Int. Cl. H01m 29/02, 27/00
U.S. Cl. 136—86                                11 Claims

ABSTRACT OF THE DISCLOSURE

A temporary, removable barrier between a cell's electrolyte and one of the members of the cell's galvanic couple, which barrier isolates the member from the electrolyte during the startup (e.g., thermal activation) of the cell.

---

This invention relates generally to voltaic cells of the fused salt electrolyte type, especially fuel cells, which have their electrolyte stored as a solid in situ prior to activation. More specifically, this invention relates to a means for effecting thermal activation of such cells.

In an extraterrestrial environment (i.e., lunar excursion vehicle) such factors as volume, weight, and simplicity of activation and operation of the electrochemical energy sources are important considerations. Cells which have their electrolyte and one or both of their reactants stored in situ satisfy these requirements. In some cases the electrolyte is thus stored in the solid state. When electrical energy is required, the cell is heated to the temperature at which the elecrtolyte melts, an external circuit is closed, and current flows. It has been noted, however, that certain problems occur when activating some molten salt cells, particularly those which additionally have one of their reactants also stored within the cell itself, and especially a $Li/LiCl/Cl_2$ cell. The stored reactant can migrate through the solid electrolyte to the counterelectrode causing damage thereto. In a $Li/LiCl/Cl_2$ cell, where both the Li and the LiCl are stored in situ as solids prior to activation, the problem arises while the cell is being activated. Upon heating the cell to operating temperatures, the lithium melts prior to the fusion of the lithium chloride. The molten lithium wets the still solid and porous electrolyte. Because of the wetting and by virtue of capillary action, the lithium can migrate into the electrolyte, making substantial inroads therein. The chlorine electrode is made of carbon and hence susceptible to attack by alkali metals such as lithium. If the lithium completely traverses the electrolyte, it can react with the $Cl_2$ electrode, damaging same. However, by my invention I have eliminated this problem.

An object of this invention, therefore, is to provide a means for nondeleteriously and remotely effecting the activation of fused-salt-electrolyte fuel cells which have their electrolytes stored in situ in a solid state prior to activation.

Another object of this invention is to provide a metal barrier between the fuel and the electrolyte to isolate one from the other before and during activation until such time as the electrolyte is fused.

Another object of this invention is to provide a metal barrier between the reactants and the electrolyte of a fuel cell to substantially isolate one from the other before and during activation, which barrier is subsequently electrochemically consumed so as to expose the reactants to the electrolyte whereby normal operating conditions may commence.

Another object of this invention is to provide a metal barrier on one surface of an electrode which separates a reactant from the electrolyte of a fuel cell to substantially isolate one from the other before and during activation, which barrier is subsequently electrochemically consumed so as to expose the reactant to the electrolyte whereby normal operating conditions may commence.

Another object of this invention is to provide a process for nondeleteriously activating a liquid metal fuel, fused-salt-electrolyte, fuel cell having its fuel and electrolyte stored in situ in the solid state which process involves the step of electrochemically consuming a metal barrier placed between the fuel and the electrolyte.

These and other objects and advantages of this invention will become apparent from the detailed description thereof which follows.

Briefly state, this invention comprises an expendable, temporary or destructible barrier between a reactant and the electrolyte before and during the thermal activation of a fused salt fuel cell. The barrier is retained in position until such time as the fuel cell is thermally in condition for the intended drawing of current. Once the cell is brought up to operating temperature the barrier is removed or destroyed, thereby exposing the reactant or reactants as appropriate to the electrolyte. A particularly effective way for removing the barrier is by the electrochemical consumption thereof. For example, in the case where the barrier (an anode barrier), separates the fuel (e.g., Li) from the electrolyte, the barrier may be consumed by externally closing a circuit through a load to the oxidant (e.g., Cl) electrode. A potential difference exists between the electrodes, and current begins to flow through the load with the attendant electrochemical consumption/dissolution of the barrier. With the dissolution of the barrier the fuel is exposed to the electrolyte. Current continues to flow through the first or any subsequently applied loads, this time, however, with the EMF of the fuel-oxidant couple, rather than the EMF of the barrier-oxidant couple.

Similarly, an externally applied current, as from a battery, may be applied to the barrier and a supplementary counterelectrode. In this latter case, the barrier is made anodic to the supplementary electrode. The barrier would be electrochemically depleted as is the anode in a plating operation. Such a variation might well be employed where a higher rate of barrier destruction is required than could otherwise be effected by the electrochemical consumption previously discussed.

The important feature of this invention resides in the placement of an expendable barrier between a reactant and the electrolyte during the start-up activation phase of the fuel cell. How the barrier is removed is of secondary importance. Hence, while electrochemical consumption of the barrier is preferred, other mechanical or chemical destruction techniques may be employed as appropriate.

Figure 1:
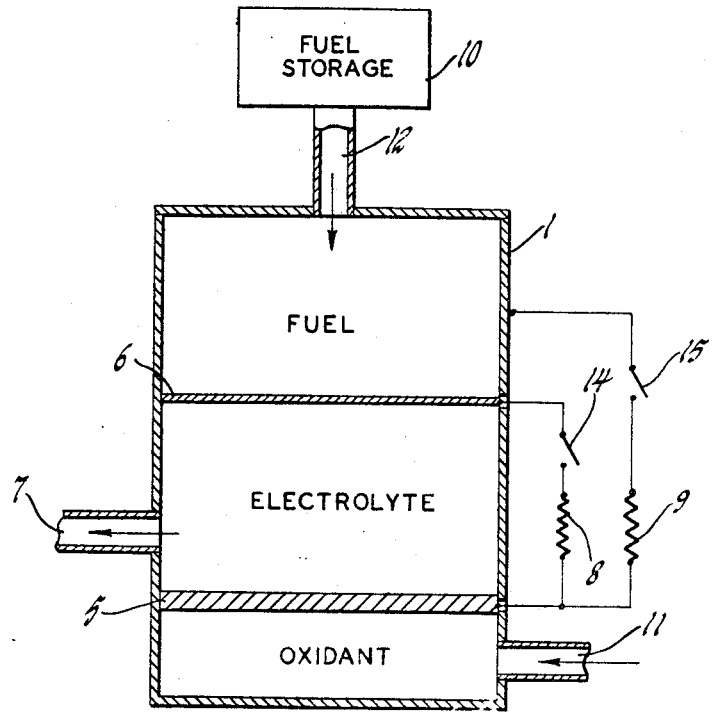
FIGURE 1 is a schematic representation of but one embodiment of a device encompassed within the scope of this invention.

Referring to the drawings, FIGURE 1 is a schematic representation of a molten metal, fused salt-electrolyte, fuel cell wherein the specific gravity of the molten metal is less than the specific gravity of the fused salt. In such a device the fuel-electrolyte electrochemical reaction interface occurs at the boundary which results from the floating of the lighter metal atop the heavier electrolyte. The cell of FIGURE 1 comprises a container or housing 1 enclosing a fuel space, an electrolyte space, and an oxidant space. Electrical insulators, not shown, must, of course, be placed as appropriate to preclude short circuiting the cell. Before start-up, the fuel in the fuel space and the electrolyte in the electrolyte space are in a solid state and are separated one from the other by metal foil 6. In a Li/LiCl/Cl$_2$ system, foil 6 may advantageously be comprised of iron or its alloys, tungsten, or any metal or alloy which does not melt or form a liquid alloy with the fuel metal at the temperature at which the electrolyte fuses. The electrolyte (LiCl) is separated from the oxidant (Cl$_2$) by means of gas electrode 5. In some applications, however, the oxidant may be dissolved directly in the electrolyte. Additional fuel for the cell may be stored externally as represented by storage means 10 and may be conveyed to the fuel space by a conduit 12.

Additional oxidant is conveyed to the oxidant space by conduit 11. When it is desired to prepare the cell for use, the cell is heated to a temperature where both the fuel and the electrolyte are molten. In the case of a Li/LiCl/Cl$_2$ cell, the lithium (M.P. 180° C.) becomes molten before the LiCl (M.P. 614° C.) is fused. However, as the temperature rises from 180° C. to 614° C., foil 6 prevents the molten fuel from making inroads into the still solid electrolyte as previously discussed. After the cell has been brought up to operating temperature, the oxidant introduced, and the switch 14 closed, current then flows through start-up load 8. Any sequence of these steps is acceptable. The current flows as a result of the electrochemically generated EMF between the foil 6 and the electrode 5. As this current is drawn the foil 6 is electrochemically consumed, ultimately exposing the fuel to the electrolyte. With the consumption of foil 6 and the exposure of fuel (Li) to the electrolyte (LiCl), the cell is in condition to be operated in its intended manner. The fuel (Li) and oxidant (Cl$_2$) then form the EMF generating electrochemical couple, with the attendant consumption of each. Hence, during the start-up phase of the cell the EMF generated corresponds to that of the barrier-oxidant couple, and during the normal operating phase of the cell the EMF generated corresponds to that of the fuel-oxidant couple. Excess electrolyte formed is removed from the cell by any convenient exit conduit 7. An opening of switch 14 and a closing of switch 15 removes the start-up load 8 from the circuit and interjects the operating load 9.

Figure 2:
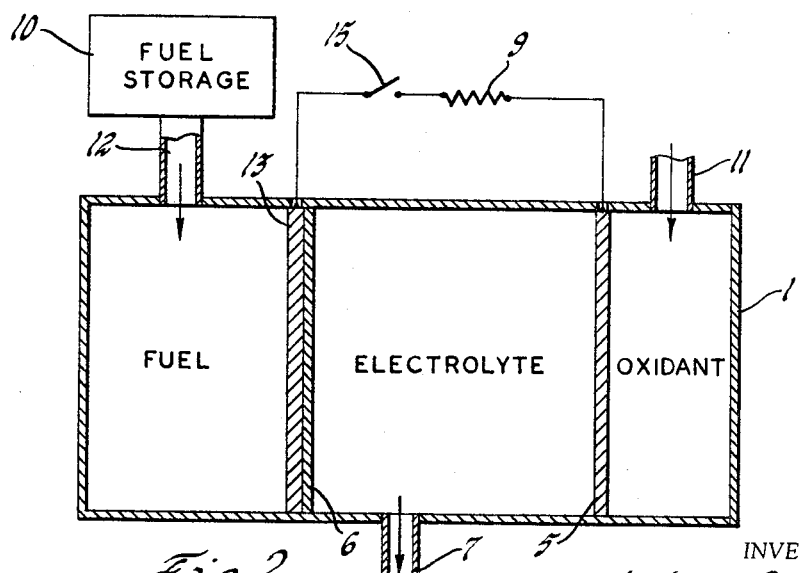
FIGURE 2 is a schematic representation of another embodiment of a device encompassed within the scope of this invention.

FIGURE 2 is a variation of the device disclosed in FIGURE 1 but which need not rely on the differences between the relative specific gravities of the respective materials to effect the fuel-electrolyte interface as in the device of FIGURE 1. In FIGURE 2 the fuel electrolyte interface is maintained by fuel electrode 13. In this case, the electrode 13 effects the reaction interface between the fuel and the electrolyte. In this embodiment, barrier 6 is a metal film on the electrolyte side of electrode 13. When the cell is brought up to operating temperature, the switch 15 is closed causing current to flow through load 9 which may, as depicted here, be the operating load itself. Likewise, as discussed in FIGURE 1, as the barrier 6 is consumed and the fuel is exposed to the electrolyte, the potential difference between electrode 13 and electrode 5 changes so as to approach the intended operating potential difference of the desired fuel-oxidant couple.

EXAMPLE

In a Li/LiCl/Cl$_2$ system wherein normal operating temperature is about 640° C., which is in excess of the fusion temperature of the electrolyte (LiCl), the fuel (Li) first becomes molten at 180° C. A 3 mil anode barrier comprised of iron is advantageously used. Barrier thicknesses generally in the order of about 1–5 mils are preferred, with the specific thickness required dependent on the conditions of the system in which it is used. In certain instances an even thinner barrier is sufficient. Iron will not form an alloy with the fuel metal (Li), will not melt (M.P. 1535° C.) before the fusion temperature of the electrolyte (LiCl), (M.P. 614° C.) and is readily electrochemically consumed when coupled with Cl$_2$. A theoretical EMF of about 1.8 volts is approached when the iron barrier is initially coupled with the chlorine electrode. As the iron barrier dissolves and fuel (Li) becomes exposed to the electrolyte the EMF begins to rise, ultimately approaching the theoretical operating EMF of about 3.50 volts for the Li-Cl$_2$ electrochemical couple.

While this invention has been disclosed in terms of but two specific embodiments, I do not intend to be limited thereby, except as by the appended claims.

I claim:

1. A process for thermally activating a fuel cell which has its fuel and electrolyte stored in the cell in the solid state but separated one from the other by a temporary, removable barrier, which barrier is formed of a nonfusible, impermeable material which will not alloy with said fuel at the operating temperature of said cell, said process comprising the steps of heating said cell to a temperature above which said fuel and said electrolyte are molten, introducing an oxidant, removing said barrier after said heating to expose said fuel to said electrolyte, and closing an electrical circuit between said fuel and said oxidant.

2. The process of claim 1 wherein said barrier comprises a consumable metal and removing said barrier by closing an electrical circuit between said barrier and said oxidant.

3. A process for thermally activating a fuel cell which has its fuel and electrolytes stored in the cell in the solid state but separated one from the other by a nonfusible, impermeable metal barrier which will not alloy with said fuel at the operating temperature of said cell, said process comprising the steps of heating said cell to a temperature above which said fuel and said electrolyte are molten, electrochemically consuming said barrier by applying a direct current to said barrier and a supplementary counterelectrode so as to have said barrier anodic relative to said supplementary counterelectrode to expose said molten fuel to said molten electrolyte, introducing an oxidant to said cell, and closing an electrical circuit between said fuel and said oxidant.

4. In a galvanic cell having a cathode and chamber means for containing electrolyte between first and second members of said cell's principal galvanic couple, the improvement comprising a temporary, anodically-destructible barrier situate between said first member and said electrolyte for isolating said first member from said electrolyte during the startup phase of said cell and electric circuit means connecting said barrier to said cathode, said barrier being further characterized by being impermeable, nonfusible and unalloyable with said first member at the operating temperature of said cell.

5. A cell as claimed in claim 4 wherein said barrier comprises a sheet of metal foil.

6. A cell as claimed in claim 5 wherein said electrolyte comprises lithium chloride and said principal galvanic couple comprises the lithium-chlorine couple.

7. A cell as claimed in claim 6 wherein said first member comprises lithium and said foil comprises a metal from the group consisting of iron, tungsten and alloys thereof.

8. A device as claimed in claim 4 wherein said first member is divided from said electrolyte chamber by an electrode and said barrier is formed on a surface of said electrode.

9. A device as claimed in claim 8 wherein said barrier comprises a metal film.

10. The cell as claimed in claim 9 wherein said electrolyte comprises lithium chloride and said principal galvanic couple comprises the lithium-chlorine couple.

11. A device as claimed in claim 10 wherein said film comprises a metal from the group consisting of iron, tungsten and alloys thereof.

References Cited

UNITED STATES PATENTS

| | | | |
|---|---|---|---|
| 2,921,110 | 1/1960 | Crowley et al. | 136—86 |
| 3,031,518 | 4/1962 | Werner et al. | 136—86 |
| 3,043,898 | 7/1962 | Miller et al. | 136—86 |
| 3,228,801 | 1/1966 | Snyder | 136—113 |
| 3,332,804 | 7/1967 | Zaromb | 136—113 X |
| 3,321,335 | 5/1967 | Wilson | 136—114 X |

ALLEN B. CURTIS, Primary Examiner

U.S. Cl. X.R.

136—90